(12) United States Patent
Hammer (10) Patent No.: US 9,902,434 B2
(45) Date of Patent: Feb. 27, 2018

(54) OFFSET DEFORMING FENDER ATTACHMENT BRACKET

(71) Applicant: Toyota Motor Engineering & Manufacturing North America, Inc., Erlanger, KY (US)

(72) Inventor: Jeremiah T. Hammer, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 188 days.

(21) Appl. No.: 14/813,246

(22) Filed: Jul. 30, 2015

(65) Prior Publication Data

US 2017/0029032 A1 Feb. 2, 2017

(51) Int. Cl.
*B60R 21/34* (2011.01)
*B62D 25/16* (2006.01)

(52) U.S. Cl.
CPC ............ *B62D 25/163* (2013.01); *B60R 21/34* (2013.01); *B60R 2021/343* (2013.01)

(58) Field of Classification Search
CPC ......... B62D 25/10; B60R 21/38; B60R 21/34; B60R 2021/343; B60R 2021/346
USPC .......... 296/187.04, 187.09, 193.11; 180/69.2
See application file for complete search history.

(56) References Cited

U.S. PATENT DOCUMENTS

| | | | |
|---|---|---|---|
| 1,470,970 A | 10/1923 | Groff | |
| 3,528,530 A | 9/1970 | Franck et al. | |
| 4,190,276 A | 2/1980 | Hirano et al. | |
| 4,703,669 A | 11/1987 | Hyodo | |
| 5,096,223 A | 3/1992 | Tekelly et al. | |
| 5,314,229 A | 5/1994 | Matuzawa et al. | |

(Continued)

FOREIGN PATENT DOCUMENTS

| | | |
|---|---|---|
| CN | 203651925 | 6/2014 |
| CN | 204150120 | 2/2015 |

(Continued)

OTHER PUBLICATIONS

Definition of lateral edge from www.earycalculation.com/maths-dictionary/lateral_edge.html, Oct. 10, 2017.*

*Primary Examiner* — H Gutman
(74) *Attorney, Agent, or Firm* — Dinsmore & Shohl LLP (57) ABSTRACT

A vehicle including a fender panel support assembly includes a hood that at least partially covers an engine compartment. A front fender structure includes a connecting wall portion located at least partially below the hood in a vehicle vertical direction. A side structural member extends in a vehicle longitudinal direction. An offset deforming fender attachment bracket mounts the front fender structure to the side structural member. The offset deforming fender attachment bracket includes a fender attachment portion connected to the connecting wall portion of the front fender structure at a connecting location. A support leg is connected to the side structural member. The support leg extends toward the side structural member from a lateral edge of the fender attachment portion. The support leg includes an apex portion connected to the lateral edge of the fender attachment portion that is spaced outboard from the connecting location in a vehicle lateral direction.

17 Claims, 9 Drawing Sheets

(56) References Cited

U.S. PATENT DOCUMENTS

| | | | |
|---|---|---|---|
| 5,984,403 A | 11/1999 | Kuroda | |
| 6,547,316 B2 | 4/2003 | Chung | |
| 6,554,341 B2 | 4/2003 | Lee | |
| 6,612,644 B2 | 9/2003 | Ahn | |
| 6,676,197 B2 | 1/2004 | Ozawa | |
| 6,698,820 B2 | 3/2004 | Nakata | |
| 6,824,199 B2 | 11/2004 | Weik et al. | |
| 6,926,349 B2 | 8/2005 | Cordebar et al. | |
| 7,128,339 B2 | 10/2006 | Mani | |
| 7,159,911 B2 | 1/2007 | Nguyen et al. | |
| 7,204,545 B2 | 4/2007 | Roux et al. | |
| 7,287,809 B2 | 10/2007 | Andre | |
| 7,413,239 B2 | 8/2008 | Mitsuyama | |
| 7,497,503 B2 | 3/2009 | Ito | |
| 7,614,688 B2 * | 11/2009 | Noel | B60R 21/34 296/187.04 |
| 7,849,559 B2 | 12/2010 | Lindmark et al. | |
| 8,182,027 B2 | 5/2012 | Steinhilb | |
| 8,931,818 B2 * | 1/2015 | Inoue | B60N 3/026 296/1.02 |
| 8,944,495 B2 | 2/2015 | Tsuneyama et al. | |
| 9,446,794 B2 * | 9/2016 | Kobayashi | B62D 25/163 |
| 2002/0063443 A1 * | 5/2002 | Lee | B60R 21/34 296/198 |
| 2004/0251716 A1 | 12/2004 | Choi et al. | |
| 2006/0064845 A1 | 3/2006 | Fiji et al. | |
| 2009/0278383 A1 * | 11/2009 | Lindmark | B60R 21/34 296/187.04 |
| 2010/0314518 A1 * | 12/2010 | Steinhilb | B62D 25/163 248/274.1 |
| 2014/0138986 A1 * | 5/2014 | Tsuneyama | B62D 25/163 296/187.09 |

FOREIGN PATENT DOCUMENTS

| | | | |
|---|---|---|---|
| EP | 1749710 | 6/2010 | |
| EP | 2733053 A4 * | 3/2015 | B62D 25/163 |
| JP | 2001287669 | 10/2001 | |
| JP | 2003118639 | 4/2003 | |
| JP | 2006224800 | 8/2006 | |
| JP | 4811327 | 11/2011 | |
| JP | 5553819 | 7/2014 | |

* cited by examiner

OFFSET DEFORMING FENDER ATTACHMENT BRACKET

TECHNICAL FIELD

The present specification generally relates to fender structure assemblies for vehicles and, more specifically, to offset deforming fender attachment brackets for use in mounting fenders to vehicles.

BACKGROUND

A number of countries have organizations that monitor safety performance of automobiles. For example, the European New Car Assessment Program (Euro NCAP) and the Japan New Car Assessment Program (JNCAP) provide rating schemes for crash testing automobiles. One area of interest relates to pedestrian head impacts, for example, along the front of the vehicle.

It is known that automobile bodies are typically formed of a number of panels that are mounted to support structures. One such panel is a fender structure, which is disposed on an apron structural member. Fender attachment brackets have been proposed for attaching the fender structure to an apron structural member and function to absorb impact energy.

SUMMARY

In one embodiment, a vehicle including a fender panel support assembly includes a hood that at least partially covers an engine compartment. A front fender structure includes a connecting wall portion located at least partially below the hood in a vehicle vertical direction. A side structural member extends in a vehicle longitudinal direction. An offset deforming fender attachment bracket mounts the front fender structure to the side structural member. The offset deforming fender attachment bracket includes a fender attachment portion connected to the connecting wall portion of the front fender structure at a connecting location. A support leg is connected to the side structural member. The support leg extends toward the side structural member from a lateral edge of the fender attachment portion. The support leg includes an apex portion connected to the lateral edge of the fender attachment portion that is spaced outboard from the connecting location in a vehicle lateral direction.

In another embodiment, a method of supporting a front fender structure of a fender panel support assembly of a vehicle is provided. The method includes supporting the front fender structure on a side structural member using an offset deforming fender attachment bracket that connects the front fender structure to the side structural member. The offset deforming fender attachment bracket includes a fender attachment portion connected to the connecting wall portion of the front fender structure at a connecting location. A support leg is connected to the side structural member. The support leg extends toward the structural member from a lateral edge of the fender attachment portion. The front fender structure is displaced outboard in a vehicle lateral direction using the offset deforming fender attachment bracket that is configured to move the fender attachment portion from an initial configuration to an offset configuration that is outboard of the initial configuration in response to an impact force applied to the connecting location of the fender attachment portion.

In another embodiment, an offset deforming fender attachment bracket includes a fender attachment portion that connects to a front fender structure at a connecting location. The fender attachment portion includes an inner edge, an outer edge and lateral edges that extend between the inner and outer edges. A support leg connects to a side structural member. The support leg extends from one of the lateral edges of the fender attachment portion. The support leg includes an apex portion connected to the one of the lateral edges of the fender attachment portion that is spaced from the connecting location toward the outer edge of the fender attachment portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to offset deforming fender attachment brackets for use in mounting fenders to vehicles. The offset deforming fender attachment brackets include a fender attachment portion that attaches to a fender structure and support legs that extend outwardly from the fender attachment portion that attach to a support structure. As will be described in greater detail below, the fender attachment portion and the support legs are shaped and arranged to cause an outward motion of the fender structure during an impact to the fender structure by having impact forces applied to the fender attachment portion offset from reaction forces applied through the support legs in a vehicle lateral direction.

Figure 1:
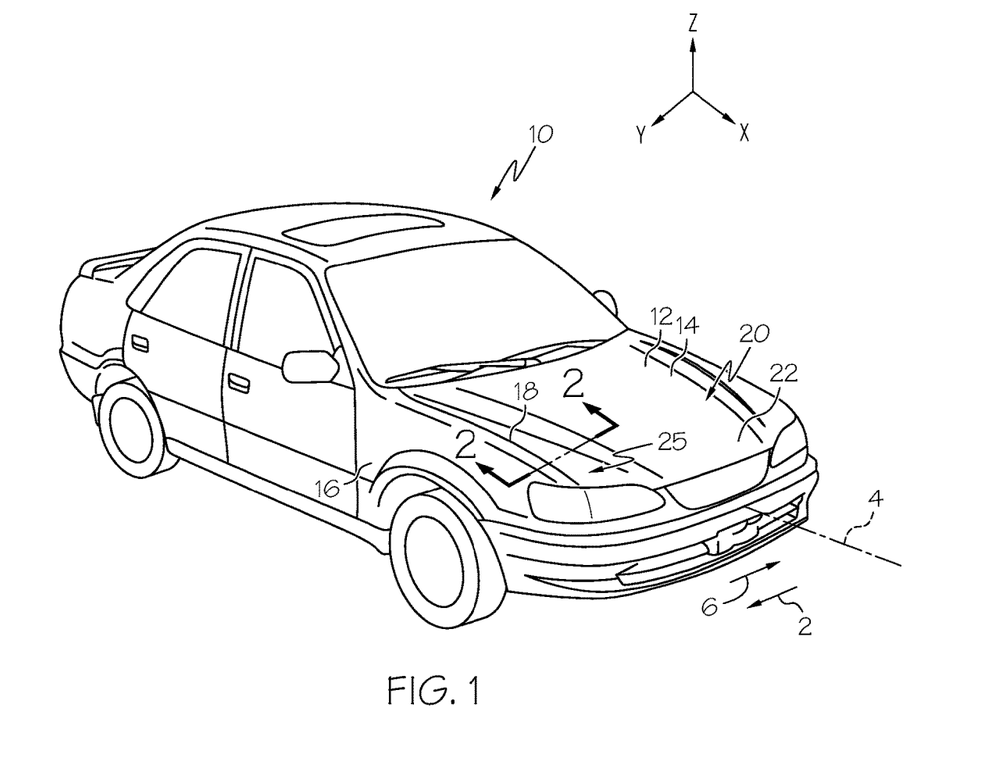
FIG. 1 is a perspective view of a motor vehicle according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Figure 2:
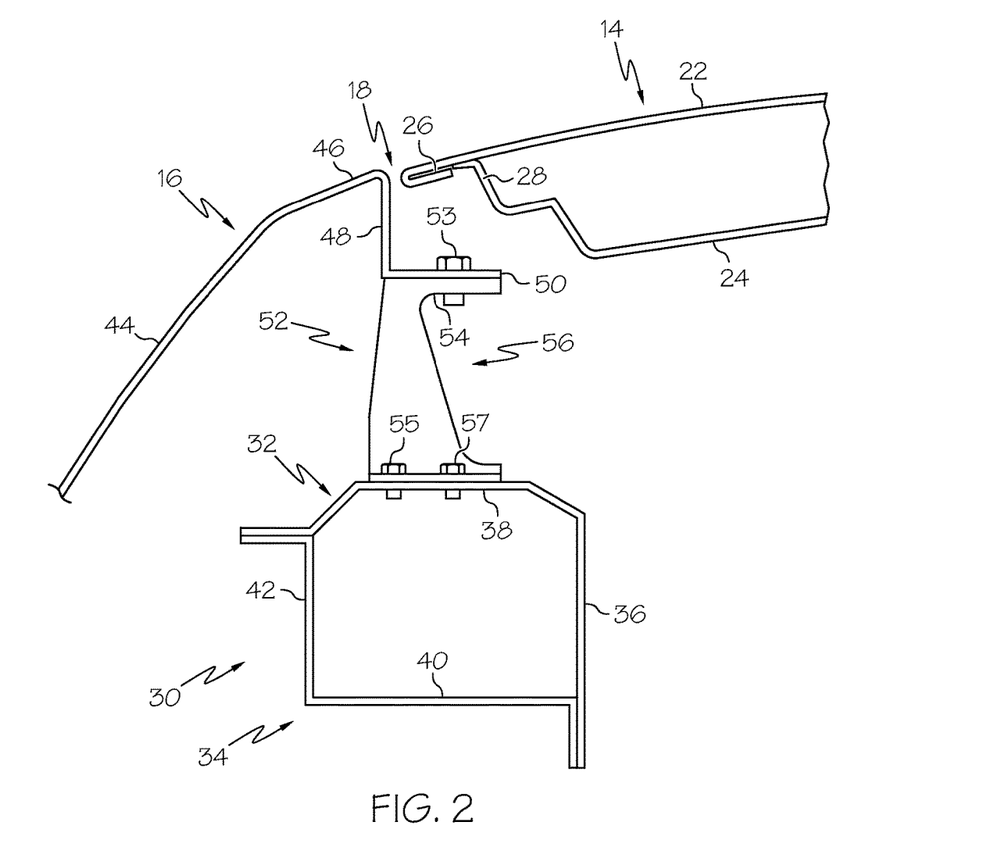
FIG. 2 is a diagrammatic section view along lines 2-2 of FIG. 1 illustrating an embodiment of a fender structure according to one or more embodiments shown and described herein.

The vehicle 10 includes a vehicle body 12 with a hood 14, a front fender structure 16 and a boundary line 18 running along the length of the vehicle 10 between the hood 14 and the front fender structure 16. The hood 14 (which may be formed of a metal material) is generally disposed above an engine compartment 20 so as to be able to open the hood 14 to gain access to the engine compartment 20. The hood 14 may be formed of multiple panels, such as an outer hood panel 22 and an inner hood panel 24 (FIG. 2). The front fender structure 16, which may be formed of a metal or plastic material, is located to an outboard side of the outer hood panel 22. As will be described in greater detail below, the front fender structure 16 is attached to a side or apron structural member by attachment brackets forming a fender panel support assembly generally designated element 25 that is positioned along the length of the vehicle 10.

Referring to FIG. 2, the inner hood panel 24 is located on a lower side of the outer hood panel 22. The inner hood panel 24 may be attached to the outer hood panel 22 such that an outer edge portion 26 of the outer hood panel 22 is fixed by hemming to an outer flange 28 of the inner hood panel 24 that projects outward in the vehicle lateral direction. Any other suitable connection structure may be used to connect the inner and outer hood panels 24 and 22.

A side or apron structural member 30 is located below the boundary line 18 between the hood 14 and the front fender structure 16. The apron structural member 30 extends generally in the lengthwise direction of the vehicle 10 with the boundary line 18. The apron structural member 30 includes an upper apron member 32 and a lower apron member 34. The upper apron member 32 includes a vertical portion 36 that is connected to a horizontal portion 38 forming a somewhat L-shaped section as viewed in the lengthwise direction of the vehicle 10. It should be noted that the term "vertical" means to extend generally in a vertical direction and is not meant to exclude one or more horizontally extending components. Similarly, the term "horizontal" means to extend generally in a horizontal direction and is not meant to exclude one or more vertically extending components. The lower apron member 34 includes a horizontal portion 40 connected to a vertical portion 42 forming a somewhat L-shaped section as viewed in the lengthwise direction of the vehicle 10. The upper and lower apron members 32 and 34 may be connected in any suitable manner such as by fasteners, welding, etc. In some embodiments, the upper apron member 32 and the lower apron member 34 cooperate to form a closed space or area that extends in the lengthwise direction of the vehicle 10. Other configurations are possible for the apron structural member 30, such as a U-shaped upper member that is connected to an L-shaped lower member.

Figure 3:
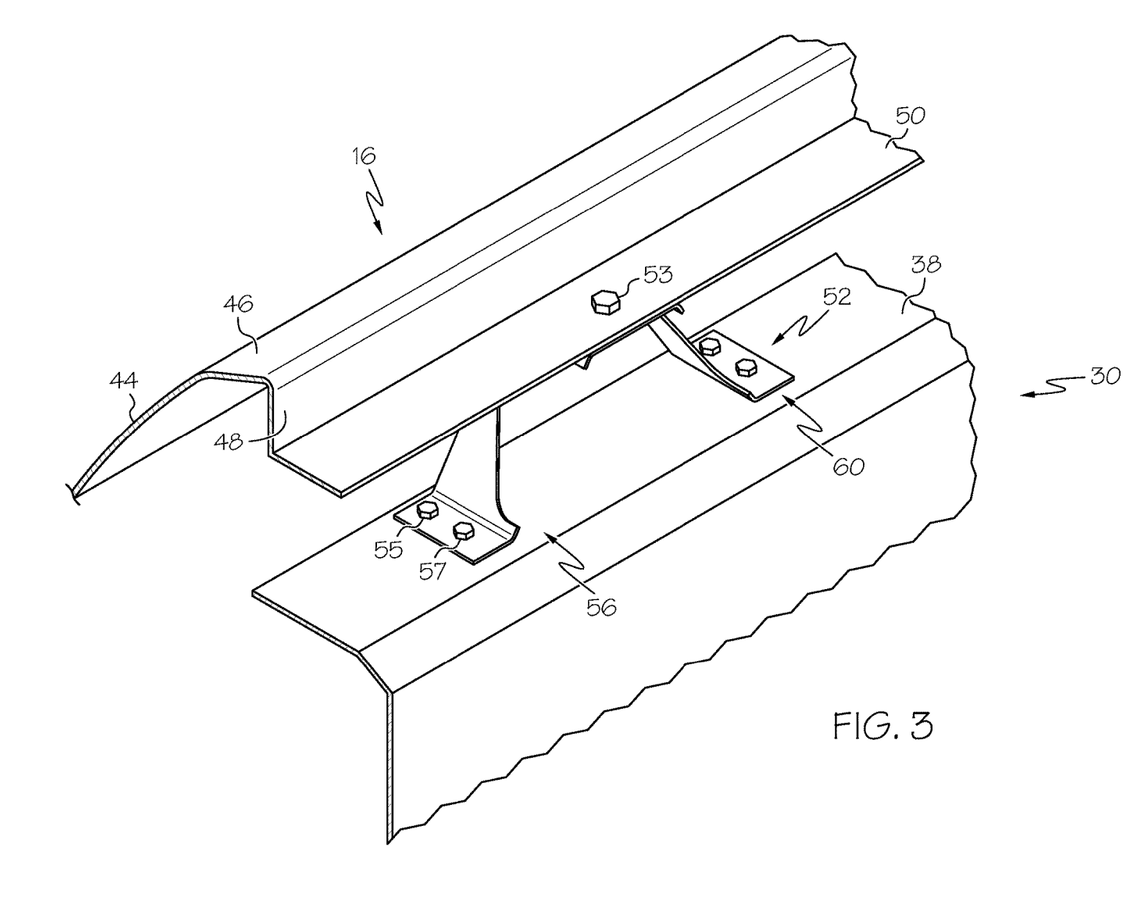
FIG. 3 is a perspective view of the fender structure of FIG. 2.

Referring to FIGS. 2 and 3, the front fender structure 16 includes an outer wall 44 that extends downward from a top end portion 46 of the outer wall 44 toward a front wheel of the vehicle 10. An inner wall 48 extends downwardly from the top end portion 46 at the boundary line 18 to a connecting wall portion 50 disposed at least partially below the hood 14.

An offset deforming fender attachment bracket 52 connects the front fender structure 16 at the connecting wall portion 50 portion to the upper apron member 32 at the horizontal portion 38. A fastener 53 may connect the offset deforming fender attachment bracket 52 to the connecting wall portion 50 and fasteners 55 and 57 may connect the offset deforming fender attachment bracket 52 to the upper apron member 32. In other embodiments, welds may connect the offset deforming fender attachment bracket 52 to the upper apron member 32, for example, instead of fasteners 55 and 57. As will be described in greater detail below, the offset deforming fender attachment bracket 52 includes a fender attachment portion 54 and one or more support legs 56 and 60 that are shaped and arranged to cause an outward motion of the front fender structure 16 during an impact at the front fender structure 16 by having impact forces applied to the fender attachment portion 54 offset from reaction forces applied through the support legs 56 and 60 in a vehicle lateral direction.

Figure 4:
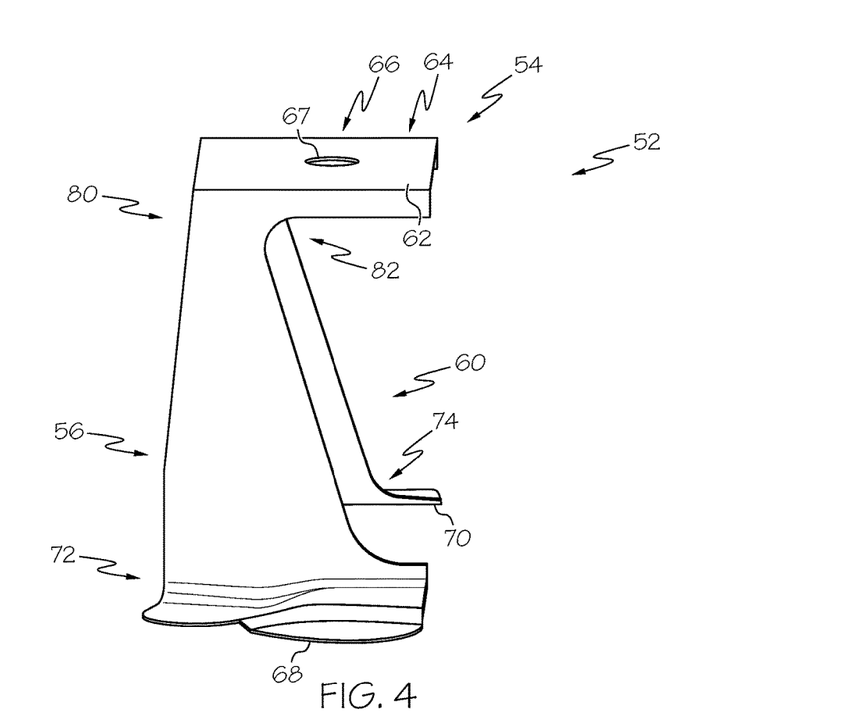
FIG. 4 is a side view of an embodiment of an offset deforming fender attachment bracket for use in the fender structure of FIG. 2 according to one or more embodiments shown and described herein.

Referring to FIG. 4, the offset deforming fender attachment bracket 52 is illustrated in isolation and includes the fender attachment portion 54 and the support legs 56 and 60 that extend outwardly from the fender attachment portion 54 at opposite lateral edges 62 and 64, respectively, of the fender attachment portion 54. The fender attachment portion 54 extends between the support legs 56 and 60 and includes a connecting structure 66 in the form of an opening 67 that connects to the connecting wall portion 50 of the front fender structure 16. A foot 68 and 70 is illustrated as extending outwardly from the support legs 56 and 60, spaced away from the fender attachment portion 54 at base portions 72 and 74 of each support leg 56 and 60. The feet 68 and 70 may be used to connect the offset deforming fender attachment bracket 52 to the upper apron member 32. The feet 68 and 70 may include openings (see FIG. 3) through which the fasteners 55 and 57 may be inserted. In other embodiments, fasteners 55 and 57 may not be used to connect the feet 68 and 70 to the upper apron member 32. For example, the feet 68 and 70 may be welded to the upper apron member 32.

Figure 5:
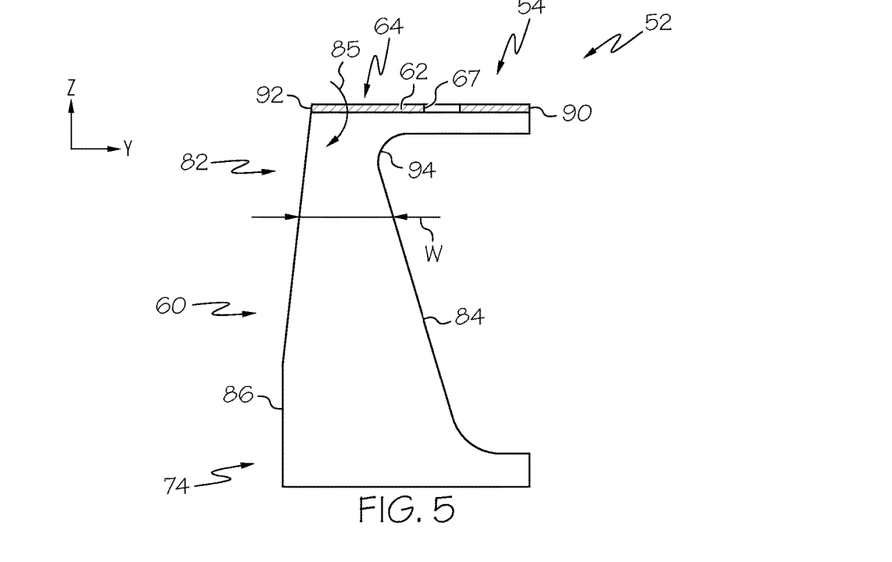
FIG. 5 is a section view of the offset deforming fender attachment bracket of FIG. 4.

The support leg 56 includes the base portion 72 that is connected to the foot 68 and an apex portion 80 that is connected to the lateral edge 62 of the fender attachment portion 54. Likewise, the support leg 60 includes the base portion 74 and an apex portion 82 that is connected to the lateral edge 64 of the fender attachment portion 54. Referring to FIG. 5 showing a cross-section of the offset deforming fender attachment bracket 52 for simplicity, each support leg (only support leg 60 is illustrated) includes an inner side 84 and an outer side 86. In the illustrated example, the inner side 84 extends from the base portion 74 in a direction toward the outer side 86 thereby providing a tapered width W as the support leg 60 extends from the base portion 74 toward the apex portion 82.

The fender attachment portion 54 is somewhat of a platform-shape that is cantilevered to the apex portion 80 of the support leg 60. The fender attachment portion 54 includes an inner edge 90, an outer edge 92 and the opposite lateral edges 62 and 64 that extend therebetween. In the illustrated example, the apex portion 82 of the support leg 60 may extend from the outer edge 92, toward the inner edge 90 and terminate at an outermost location 94 that is located outboard (or spaced-away in the widthwise direction) from the opening 67. The fender attachment portion 54 may extend inwardly beyond at least a portion of the inner side 84 of the support leg 60. As can be appreciated, with the fender attachment portion 54 supported at primarily the outer edge 92 with the opening 67 offset to the outer side 92 from the apex portion 82 of the support leg 60, a moment axis 85 can be created at the apex portion 82 of the support leg 60, which can cause the inner edge 90 of the fender attachment portion 54 to rotate outboard in a direction toward the outer edge 92 in response to an impact force applied at the opening 67.

Without wishing to be bound by theory, head impact tests to the hood and fender areas of a vehicle have illustrated a need for providing relatively soft impacts (or reduced headform deceleration). The use of the offset deforming fender attachment bracket 52 can deform in a controlled, predictable manner that reduces headform deceleration, while also moving the front fender structure 16 away from adjacent intervening structures, such as the hood of the vehicle that can affect deceleration performance with unintended contact therebetween. However, there are other design factors, such as subjective stiffness of the front fender structure 16 in the vehicle lateral direction. The offset deforming fender attachment brackets described herein can also provide lateral subjective stiffness, for example, when a user applies a lateral force against the front fender structure 16.

Figure 6:
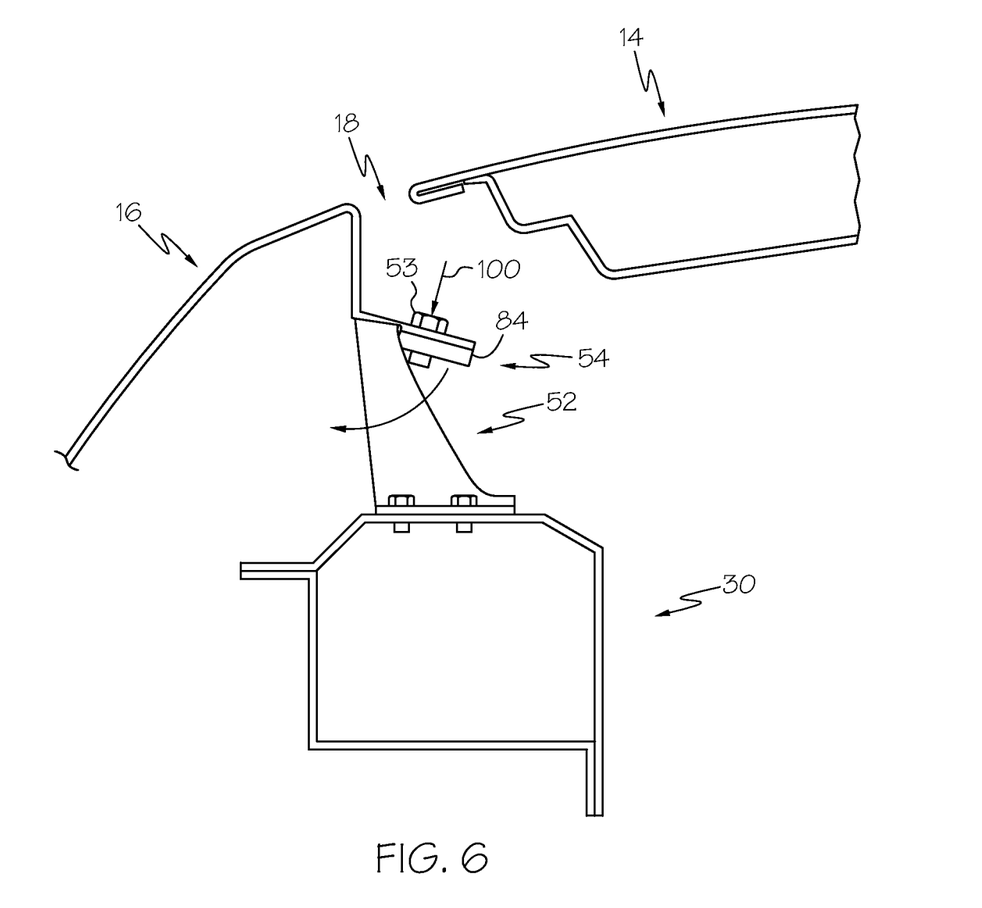
FIG. 6 is a diagrammatic section view of the offset deforming fender attachment bracket of FIG. 2 in a deformed configuration according to one or more embodiments shown and described herein.

FIG. 6 illustrates the offset deforming fender attachment bracket 52 connected to both the front fender structure 16 and the apron structural member 30 in a buckled configuration. An impact force 100 can be applied to the fender attachment portion 54 through the connection with the fastener 53. Due to the moment arm created between the impact force 100 and the axis of rotation of the fender attachment portion 54, the inner edge 84 rotates and moves outboard away from the hood 14 and the front fender structure 16 is also pushed away from the hood 14, thereby increasing the width of the boundary line 18. Such an arrangement can reduce any interference of the hood 14 with the bucking of the offset deforming fender attachment bracket 52, e.g., due to contact with the front fender structure 16.

Figure 7:
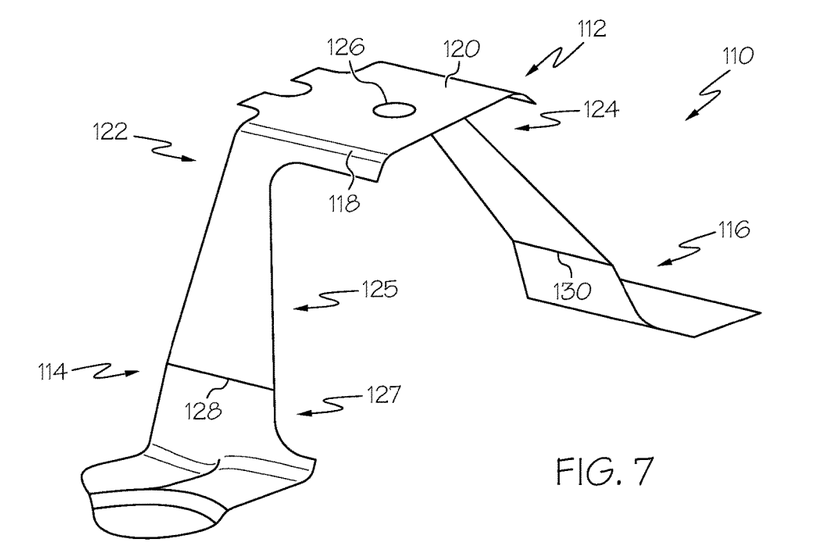
FIG. 7 is a perspective view of another embodiment of an offset deforming fender attachment bracket according to one or more embodiments shown and described herein.
Figure 8:
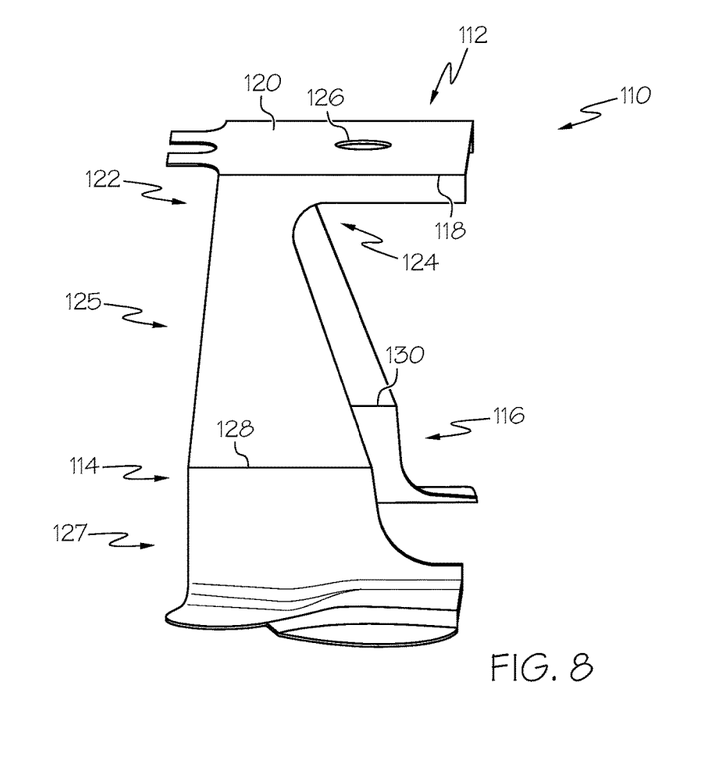
FIG. 8 is a side view of the offset deforming fender attachment bracket of FIG. 7.

Referring to FIGS. 7 and 8, another embodiment of an offset deforming fender attachment bracket 110 includes many of the features described above including a fender attachment portion 112 and support legs 114 and 116 extending outwardly from opposite lateral edges 118 and 120 of the fender attachment portion 112. As can be seen, the support legs 114 and 116 have apex portions 122 and 124 that terminate at an outermost locations that are located outboard (or spaced-away in the widthwise direction) from an opening 126 that can receive a fastener. In this embodiment, however, one or both of the support legs 114 and 116 include at least one bend 128 and 130, dividing the support legs 114 and 116 into upper and lower portions 125 and 127. Providing such a bend 128, 130 can further increase buckling of the support legs 114 and 116 during an impact.

Figure 9:
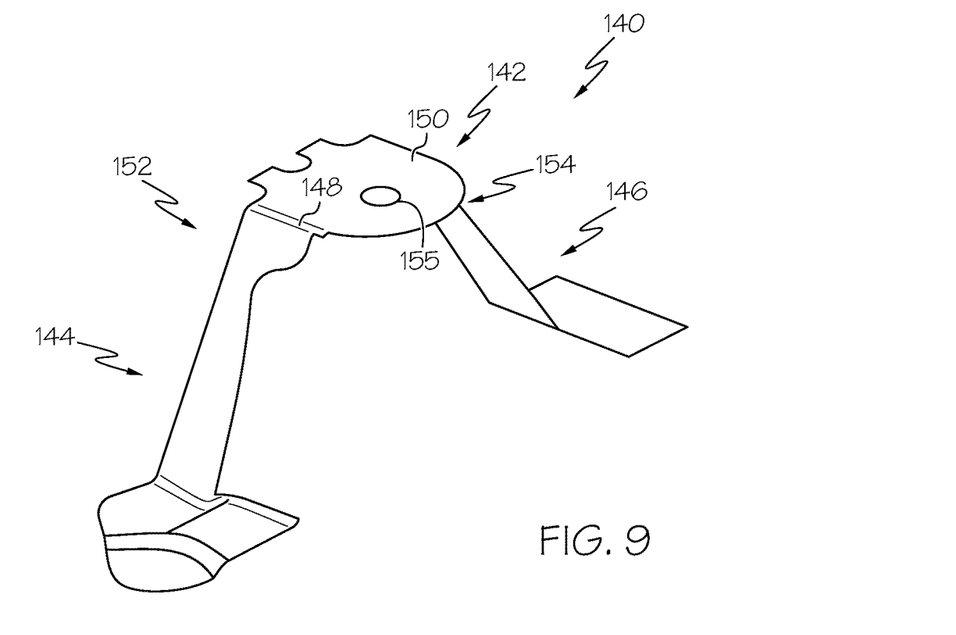
FIG. 9 is a perspective view of another embodiment of an offset deforming fender attachment bracket according to one or more embodiments shown and described herein.
Figure 10:
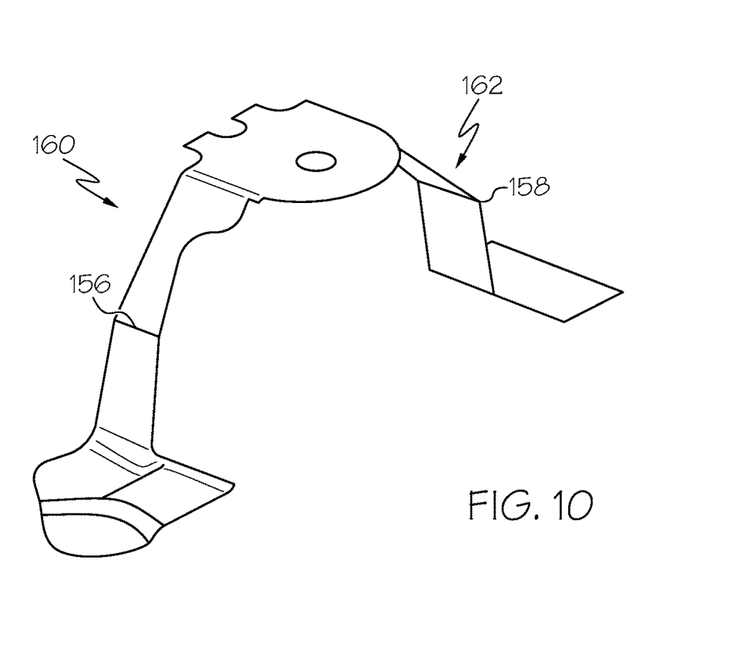
FIG. 10 is a perspective view of another embodiment of an offset deforming fender attachment bracket according to one or more embodiments shown and described herein.

Referring to FIG. 9, another embodiment of an offset deforming fender attachment bracket 140 includes many of the features described above including a fender attachment portion 142 and support legs 144 and 146 extending outwardly from opposite lateral edges 148 and 150 of the fender attachment portion 142. The support legs 144 and 146 have apex portions 152 and 154 that terminate at an outermost locations that are located outboard (or spaced-away in the widthwise direction) from an opening 155 that can receive a fastener. FIG. 10 illustrates a variation of the offset deforming fender attachment bracket 140 including bends 156 and 158 in support legs 160 and 162.

Figure 11:
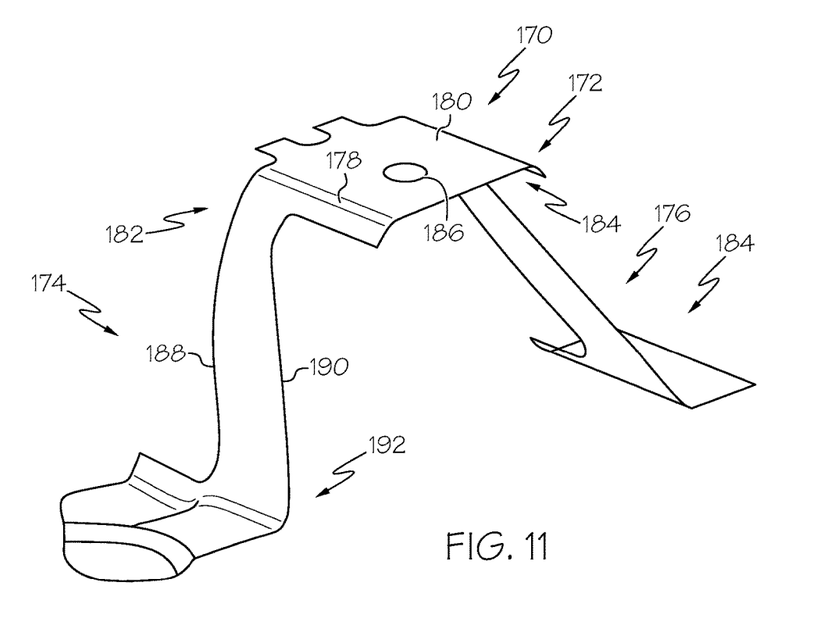
FIG. 11 is a perspective view of another embodiment of an offset deforming fender attachment bracket according to one or more embodiments shown and described herein.
Figure 12:
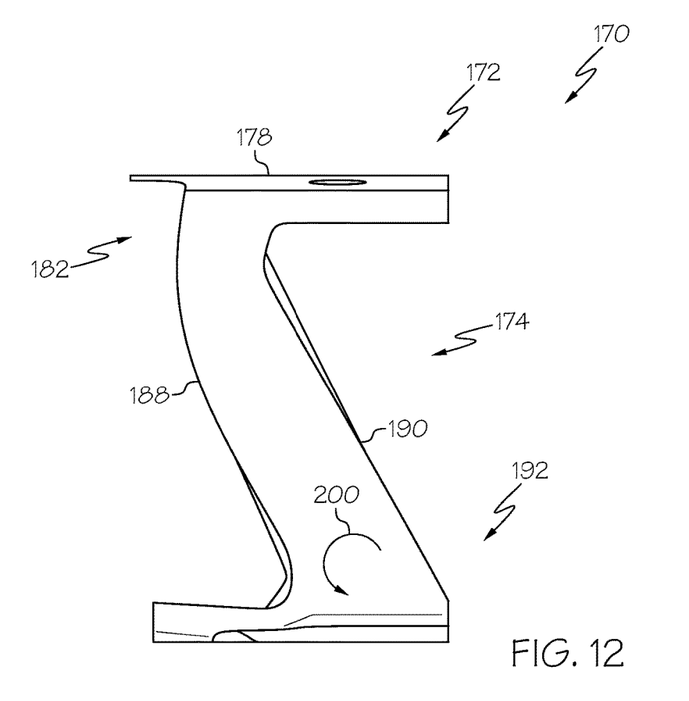
FIG. 12 is a side view of the offset deforming fender attachment bracket of FIG. 11.

Referring to FIGS. 11 and 12, another embodiment of an offset deforming fender attachment bracket 170 includes many of the features described above including a fender attachment portion 172 and support legs 174 and 176 extending outwardly from opposite lateral edges 178 and 180 of the fender attachment portion 172. The support legs 174 and 176 have apex portions 182 and 184 that terminate at an outermost locations that are located outboard (or spaced-away in the widthwise direction) from an opening 186 that can receive a fastener. In this embodiment, at least a portion of an outer sides 188 and 190 of the support legs 174 and 76 at their base portions 192 and 194 are located inbound of the outer sides 188 and 190 at their apex portions 182 and 184, forming somewhat slanted support legs 174 and 176 that provide another moment axis 200 at the base portions 192 and 194 as the fender attachment portion 172 rotates and moves the front fender structure outboard, away from the hood.

Figure 13:
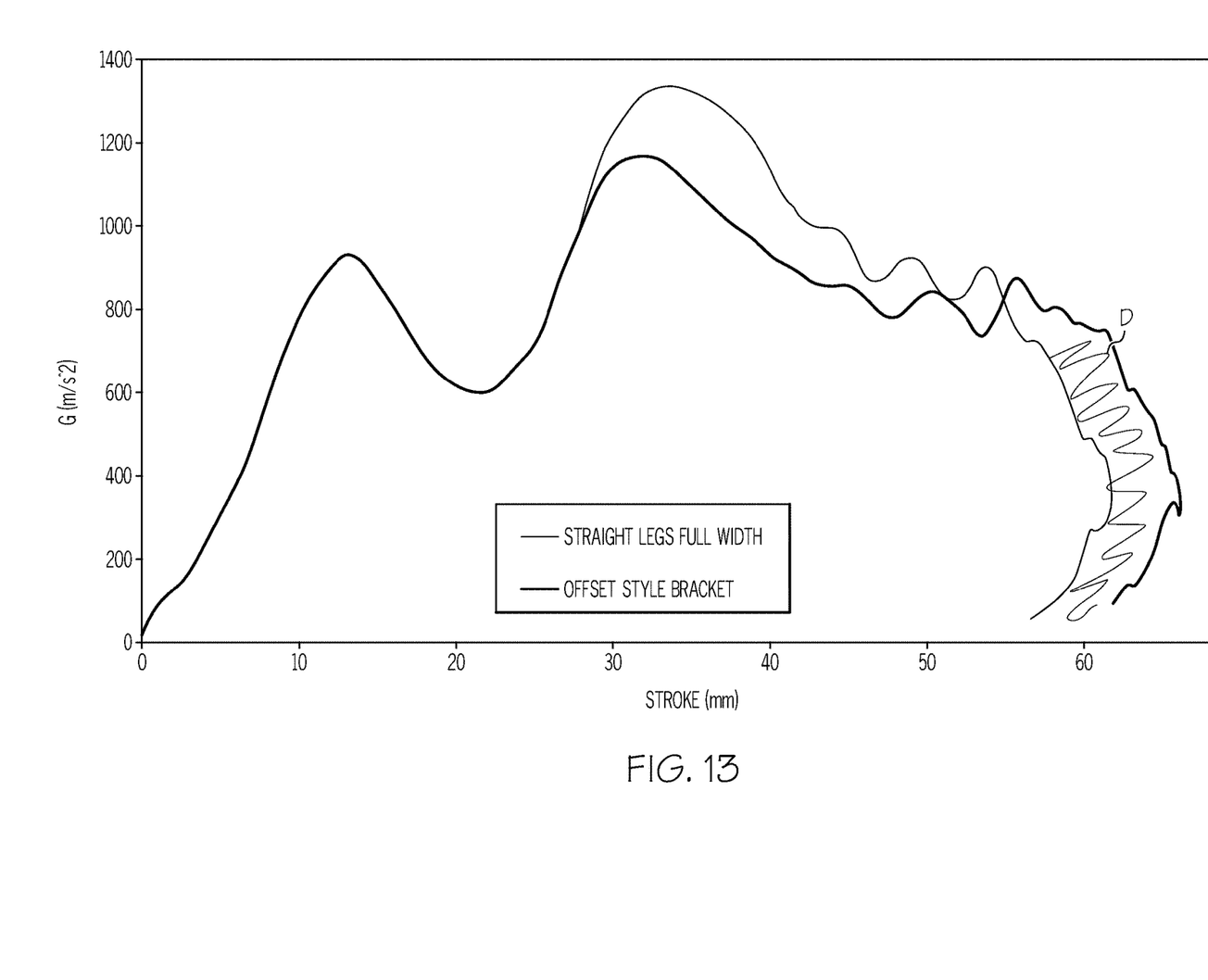
FIG. 13 is a graph of acceleration versus displacement for the pedestrian impact test using an offset deforming fender attachment bracket according to one or more embodiments shown and described herein.

The above-described offset deforming fender attachment brackets can allow for greater vertical bracket displacement and lower head acceleration which can lower head injury values (HIC). Referring to FIG. 13, a graph of acceleration versus stroke is shown for the offset deforming attachment bracket compared to an attachment bracket without offset and straight support legs. The graph of FIG. 13 may be generated using data collected from any suitable testing procedure, such as JNCAP, Euro NCAP or Global Technical Regulation (GTR) No. 9 testing procedures for pedestrians. As can be seen, the offset deforming attachment brackets can give more displacement (see region D) than the attachment bracket without offset.

The above offset deforming fender attachment brackets may be formed of any suitable material such as a metal material (e.g., steel). Any suitable process or combination of processes may be used to form the offset deforming attachment brackets such as bending, stamping, machining, etc.

The above-described offset deforming fender attachment brackets provide an attachment structure that may be used to absorb impact energy during a front collision. The offset deforming fender attachment brackets may provide for lower head decelerations and greater vertical displacement, which can reduce HIC values. Further, the offset deforming fender attachment brackets can be used to adjust a position of the fender structure outboard of the hood, which can reduce a likelihood of unintended interference between the hood and the front fender structure. The offset deforming fender attachment brackets can also provide subjective lateral rigidity of the front fender structures for users. While the above offset deforming attachment brackets are described in the context of fender panels, the offset deforming attachment brackets may be used with other vehicle panels where movement of the vehicle panels toward or away from a particular location is desired in response to an impact force.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a fender panel support assembly, comprising:
    a hood that at least partially covers an engine compartment;
    a front fender structure comprising a connecting wall portion located at least partially below the hood in a vehicle vertical direction;
    a side structural member that extends in a vehicle longitudinal direction; and
    an offset deforming fender attachment bracket that mounts the front fender structure to the side structural member, the offset deforming fender attachment bracket comprising:
        a fender attachment portion connected to the connecting wall portion of the front fender structure at a connecting location; and
        a support leg connected to the side structural member, the support leg extending toward the side structural member from a lateral edge of the fender attachment portion, the support leg including an apex portion connected to the lateral edge of the fender attachment portion that is spaced outboard from the connecting location in a vehicle lateral direction;
        wherein the apex portion of the support leg coextends widthwise with the lateral edge and the lateral edge extends beyond the apex portion in the vehicle lateral direction to a free end of the fender attachment portion such that the fender attachment portion is cantilevered to the support leg and extends inboard beyond an inner side of the support leg.

2. The vehicle of claim 1, wherein the support leg of the offset deforming fender attachment bracket includes the inner side that extends from a base portion of the support leg to the apex portion and an outer side that extends from the base portion of the support leg to the apex portion.

3. The vehicle of claim 2, wherein the inner side extends toward the outer side thereby providing the support leg with a width that tapers from the base portion to the apex portion.

4. The vehicle of claim 1, wherein the support leg is a first support leg, the offset deforming fender attachment bracket including a second support leg connected to the side structural member, the second support leg extending toward the structural member from an opposite lateral edge of the fender attachment portion.

5. The vehicle of claim 4, wherein the second support leg includes an apex portion connected to the opposite lateral edge of the fender attachment portion that is spaced outboard from the connecting location in the vehicle lateral direction.

6. The vehicle of claim 1, wherein the support leg includes a bend separating the support leg into an upper portion and a lower portion.

7. A method of supporting a front fender structure of a fender panel support assembly of a vehicle, the method comprising:
    supporting the front fender structure on a side structural member using an offset deforming fender attachment bracket that connects the front fender structure to the side structural member, the offset deforming fender attachment bracket comprising:
        a fender attachment portion connected to the connecting wall portion of the front fender structure at a connecting location; and
        a support leg connected to the side structural member, the support leg extending toward the structural member from a lateral edge of the fender attachment portion, the support leg coextending widthwise with the lateral edge and the lateral edge extends beyond the support leg in a vehicle lateral direction to a free end of the fender attachment portion such that the fender attachment portion is cantilevered to the support leg and extends inboard beyond an inner side of the support leg; and
    displacing the front fender structure outboard in the vehicle lateral direction using the offset deforming fender attachment bracket that is configured to move the fender attachment portion from an initial configuration to an offset configuration that is outboard of the initial configuration in response to an impact force applied to the connecting location of the fender attachment portion.

8. The method of claim 7, wherein the support leg includes an apex portion connected to the lateral edge of the fender attachment portion that is spaced outboard from the connecting location in the vehicle lateral direction.

9. The method of claim 8, wherein the support leg of the offset deforming fender attachment bracket includes the inner side that extends from a base portion of the support leg to the apex portion and an outer side that extends from the base portion of the support leg to the apex portion.

10. The method of claim 9, wherein the inner side extends toward the outer side thereby providing the support leg with a width that tapers from the base portion to the apex portion.

11. The method of claim 7, wherein the support leg is a first support leg, the offset deforming fender attachment bracket including a second support leg connected to the side structural member, the second support leg extending toward the structural member from an opposite lateral edge of the fender attachment portion.

12. The method of claim 11, wherein the second support leg includes an apex portion connected to the opposite lateral edge of the fender attachment portion that is spaced outboard from the connecting location in the vehicle lateral direction.

13. The method of claim 7, wherein the support leg includes a bend separating the support leg into an upper portion and a lower portion.

14. An offset deforming fender attachment bracket, comprising:
- a fender attachment portion that connects to a front fender structure at a connecting location, the fender attachment portion including an inner edge, an outer edge and lateral edges that extend between the inner and outer edges; and
- a support leg that connects to a side structural member, the support leg extends from one of the lateral edges of the fender attachment portion, the support leg includes an apex portion connected to the one of the lateral edges of the fender attachment portion that is spaced from the connecting location toward the outer edge of the fender attachment portion;
- wherein the apex portion of the support leg coextends widthwise with the lateral edge and the lateral edge extends beyond the apex portion to a free end of the fender attachment portion such that the fender attachment portion is cantilevered to the support leg and extends beyond an inner side of the support leg.

15. The offset deforming fender attachment bracket of claim 14, wherein the support leg of the offset deforming fender attachment bracket includes the inner side that extends from a base portion of the support leg to the apex portion and an outer side that extends from the base portion of the support leg to the apex angle, wherein the inner side extends toward the outer side thereby providing the support leg with a width that tapers from the base portion to the apex portion.

16. The offset deforming fender attachment bracket of claim 14, wherein the support leg is a first support leg, the offset deforming fender attachment bracket including a second support leg that extends from another one of the lateral edges of the fender attachment portion, the second support leg includes an apex portion connected to the another one of the lateral edges of the fender attachment portion that is spaced from the connecting location.

17. The offset deforming fender attachment bracket of claim 14, wherein the support leg includes a bend separating the leg into an upper portion and a lower portion.

* * * * *